(12) United States Patent
Kukkonen

(10) Patent No.: US 6,267,813 B1
(45) Date of Patent: Jul. 31, 2001

(54) METHOD FOR THE COLORATION OF CONCRETE AND OTHER MIXTURES

(76) Inventor: Pertti Juhani Kukkonen, Ilmattarentie 13, FIN 00610 Helsinki (FI)

( * ) Notice: Subject to any disclaimer, the term of this patent is extended or adjusted under 35 U.S.C. 154(b) by 0 days.

(21) Appl. No.: 09/242,462

(22) PCT Filed: Aug. 14, 1997

(86) PCT No.: PCT/FI97/00477

§ 371 Date: Mar. 26, 1999

§ 102(e) Date: Mar. 26, 1999

(87) PCT Pub. No.: WO98/06680

PCT Pub. Date: Feb. 19, 1998

(30) Foreign Application Priority Data

Aug. 15, 1996 (FI) ..................... 963206

(51) Int. Cl.[7] ............ C04B 41/65; C04B 41/50; C09D 1/06
(52) U.S. Cl. ............ 106/640; 106/644; 106/712; 427/343; 427/427
(58) Field of Search .................. 106/640, 712, 106/644; 427/343, 421, 427

(56) References Cited

U.S. PATENT DOCUMENTS

| | | | | |
|---|---|---|---|---|
| 4,247,589 | * | 1/1981 | Greenspan | 428/209 |
| 4,962,006 | * | 10/1990 | Oat | 428/703 |
| 5,344,671 | * | 9/1994 | Wottrich | 427/192 |
| 5,520,298 | * | 5/1996 | Opanasenko | 216/39 |

FOREIGN PATENT DOCUMENTS

| | | | |
|---|---|---|---|
| 55-078748 | * | 6/1980 | (JP) . |
| 55-078750 | * | 6/1980 | (JP) . |
| 55-078751 | * | 6/1980 | (JP) . |

* cited by examiner

Primary Examiner—Anthony Green
(74) Attorney, Agent, or Firm—Fay, Sharpe, Fagan, Minnich & McKee, LLP

(57) ABSTRACT

The invention concerns a method for the colouring of concrete, and especially in the colours blue or green. According to the method, copper powder from grinding work, for example, may be added before the concrete hardens. This colours the concrete mix due to its reaction with a substance added to the concrete.

17 Claims, No Drawings

METHOD FOR THE COLORATION OF CONCRETE AND OTHER MIXTURES

Concrete and other mixes using a cement binder have been traditionally coloured using conventional grey or white cement, which creates an ordinary grey tone. Hues other than grey have been created by using differently coloured aggregates or various kinds of powdered pigments.

Concrete can be coloured by adding 0–6 per cent pigment The most usual pigments are metal oxides and earth colours. For example, the use of metal oxide is known from EP application 191 278. French patent publication 2 439 627 describes a method for colouring concrete. The French publication concentrates on colouring an already hardened piece of concrete, on the assumption that it will be porous enough for the colour to adhere. Certain kinds of superficial colouration are always weak—as in the above case—because, if a colour solution can enter the pores, so can rainwater, for example, which naturally reduces the permanence and, quite clearly, the brightness of the colour.

A mortar mixture, intended only for interior use, is also known, in publication JP 87-37169, which otherwise differs considerably from cement-based concrete in composition and use. A rust colour is created in the mortar by adding iron powder and another metal with a lower ionization tendency. The iron oxidizes, forming rust, thus colouring the mortar.

Pigments have traditionally been used to colour various kinds of hardening mixtures based on plastic and resin.

Besides the aforementioned detriments, the methods according to the above state-of-the-art lack certain hues. In particular, the colours blue and green are problematic, due to the cost of the pigment needed to create them, making the manufacture of the product uneconomical.

The purpose of this invention is to create a method based on a completely new principle, which will create new kinds of colours for concrete and similar. These colours are especially, but not solely, blue and green hues. In brief, according to the invention, when metal powder or other fine metal material is mixed into the concrete or other mix, the metal will react chemically to make a compound producing the desired colour.

The above and other advantages and benefits of the invention have been created using a method with the characteristic features given in the accompanying claims.

As stated above, the invention is based on adding a metal powder or other relatively fine metal material, such as copper powder or granules, to the mix to be hardened, and treating it with a suitable chemical substance to create the colour. Thus, the chemical substance producing the colour may be included as a component of the mix itself, or may be added separately. In particular, but not exclusively—as described later—the metal powder or similar may be added to an unhardened concrete or corresponding mix, whence it spreads evenly and thoroughly in the mix, becoming bound more permanently than in known methods.

The addition of copper powder to a concrete or corresponding mix colours the mix blue or green. As the colouration is extremely strong, adding a relatively small amount of copper is sufficient to create a bright colour. It is clear that, instead of using copper powder, it is also possible to use many other alloys with a copper content, such as brass, bronze or other substances containing copper. Other cheap materials are ores that contain copper, and other similar substances that create colour. Examples of substances that colour the above mixes include ammonium chloride, ammonium carbonate, acetic acid or oxalic acid. A colour can also be created without adding reagents, due to the substances that are naturally in concrete.

Although there are innumerable alternatives for forming colour, the creation of blue or green colour, as stated above, is particularly important. Familiarity with the known chemical reactions that create colours from metal powders or similar allows a desired chemical substance to be used to create a reaction. The book, The Colouring, Bronzing and Patination of Metals, by Richard Hughes and Michael Rowe, published by Thames and Hudson Ltd., London, deals extensively with chemical substances used to treat metals.

The essence of the invention is that the colour arises from a chemical reaction and not, for example, from the mere addition of coloured particles to the mix. Thus, the permanence of the colour is of a totally different order to that of a colour created only superficially, through, for instance, a surface treatment. An example from a different field is the permanence of the colour created by a chemical reaction when a copper plate is treated with nitric acid, in comparison with the easily removable colour that results from treating the same plate with a copper sulphate solution.

The invention is described in the following text with the aid of three examples of manufacture.

EXAMPLE 1

Several doses of 1–5% copper powder or granules are added to the concrete during manufacture. In one test, grinding waste from metalwork was used and in another short lengths of waste copper wire. Due to their greater specific gravity, the copper powder or granules can, if desired, be made to sink by vibrating the mix. As a result, they settle against the facade surface of the piece being cast, and that surface acquires a brighter colour. The colour results when the copper reacts with ammonium chloride (0.1–0.5%) added to the concrete. The colour can also be created afterwards in the concrete by treating it with an ammonium chloride and/or ammonia solution.

EXAMPLE 2

The surface of the formwork fabric is brush or roller-painted with a thin (3–10 mm) cement mixture, to which 1–5% copper powder has been added. When this is still wet, normal concrete is poured on top of it and adheres to the copper-cement mixture. Thus, it is possible to economically manufacture concrete units with a coloured surface, or with a surface that can be coloured according to the basic principles described above.

EXAMPLE 3

2% copper powder is added to a hardenable mixture of resin and rock material used in sculpture. Ammonium chloride is used to create the colour. The result is a beautifully coloured material, which is as suitable as the uncoloured material for its purpose.

It is also possible to treat concrete or other mixes with a copper content in other ways —for example, in the same way that copper, or materials with a copper content, are given a patina. It is also entirely possible to use suitable chemicals to vary the colour that arises afterwards, as described in the book referred to above.

The embodiments of the method of the invention can be adapted in numerous ways. For instance, compressed air or another medium can be used to blast a material containing fine copper into the surface of an unhardened concrete or other mix, so that it penetrates for a certain distance. Clearly, in this case the powder is not spread evenly through the entire material, but this is unnecessary, as the coloured surface layer is thick enough to withstand wear.

Another adapted embodiment concerns a way of bringing the chemical substance, which creates the colour, into contact with a material containing copper, permitting a colour reaction. Thus, a fabric may be used in the framework The chemical substance can be added in a suitable manner to the formwork fabric, even if dry. When the moisture of the concrete being cast in the formwork penetrates the substance, it activates the property creating a chemical reaction. If desired, the powder containing copper can be added on top of the formwork fabric before casting. In this connection, a net-like material can also be used as the substance containing copper. Thus the copper colour results from a reaction between the substance contained in the above formwork fabric and the moisture of the concrete.

What is claimed is:

1. A method for colouring concrete and cement mixes by using a metal component to create the colour, comprising the step of: distributing metal throughout an unhardened concrete or cement mix to react there chemically to create a colour.

2. A method according to claim 1, wherein the metal is copper, or a metal alloy containing copper, and is added as powder, as granules, as pieces or as a net to the concrete or cement mix, to create a blue or green hue.

3. A method according to claim 1, further comprising the steps of: adding a chemical substance which reacts with the metal to create a colour throughout the concrete or cement mix; and reacting the chemical substance with the metal to create the colour.

4. A method according to claim 1, further comprising the step of: adding waste material containing copper, or ore with a copper content throughout the concrete or cement mix.

5. A method according to claim 1, further comprising the step of: treating a surface of a finished concrete product with a chemical substance to vary the hue obtained.

6. A method according to claim 3, further comprising the step of: adding the chemical substance, to a form work fabric comprising the concrete or cement mix.

7. A method according to claim 1, wherein the distributing step comprises: spraying the metal in the form of fine particles throughout the unhardened concrete or cement mix.

8. A method according to claim 3, wherein the chemical substance is selected from the group of ammonium chloride, ammonium carbonate, oxalic acid and acetic acid.

9. A method according to claim 2, further comprising the addition of an ammonia containing composition which reacts with the copper.

10. A method according to claim 9, wherein the ammonia containing composition is ammonium chloride or ammonium carbonate.

11. A method for colouring concrete and cement mixes by adding copper and ammonium chloride or ammonium carbonate throughout an unhardened concrete or cement mix.

12. A method according to claim 11, wherein the copper or copper alloy is added as a powder, as granules, as pieces, or as a net to the unhardened concrete or cement mix.

13. The method of claim 11, wherein said copper is a copper alloy.

14. A method for colouring concrete and cement mixes by using a metal component to create the colour, comprising the steps of: distributing metal as a powder, as granules, as pieces, or as a net throughout the unhardened concrete or cement mix; and chemically reacting the metal to create a colour.

15. A method according to claim 14, wherein the metal component is copper or a metal alloy containing copper.

16. A method according to claim 15, further comprising the step of: adding an ammonia containing composition which chemically reacts with the copper or metal alloy containing copper.

17. A method according to claim 16, wherein the ammonia containing composition is ammonium chloride or ammonium carbonate.

\* \* \* \* \*